J. CLYDESDALE.
PROTECTIVE ARMOR BELT FOR PNEUMATIC TIRES.
APPLICATION FILED AUG. 24, 1917.

1,269,388.

Patented June 11, 1918.

WITNESSES
H. T. Walker

INVENTOR
James Clydesdale
BY
ATTORNEYS

UNITED STATES PATENT OFFICE.

JAMES CLYDESDALE, OF WEEHAWKEN, NEW JERSEY.

PROTECTIVE ARMOR-BELT FOR PNEUMATIC TIRES.

1,269,388.  Specification of Letters Patent.  Patented June 11, 1918.

Application filed August 24, 1917. Serial No. 187,996.

*To all whom it may concern:*

Be it known that I, JAMES CLYDESDALE, a citizen of the United States, and a resident of Weehawken, in the county of Hudson and State of New Jersey, have invented a new and Improved Protective Armor-Belt for Pneumatic Tires, of which the following is a full, clear, and exact description.

Among the principal objects which the present invention has in view are: to prevent the puncturing of an inner tube of an automobile tire; to strengthen the resistance of a tire to the air pressure of the inner tube; and to provide an armor of the character mentioned sufficiently flexible to assume the shape of the tread portion of the tire.

Drawings.

Figure 1:
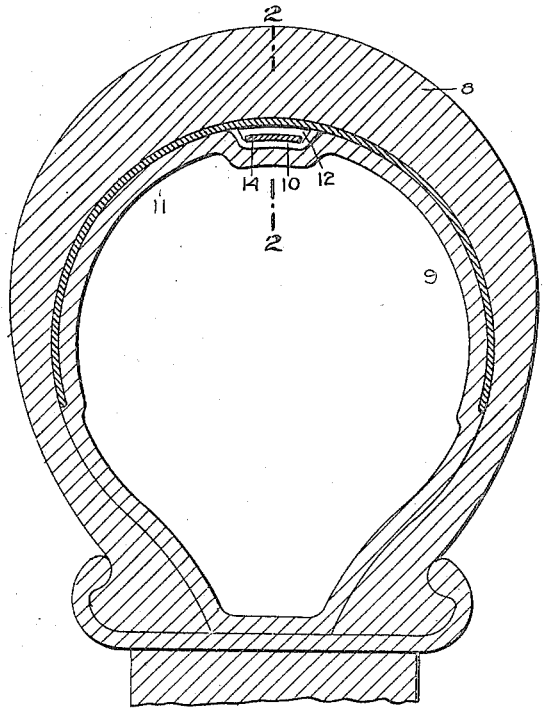
Figure 1 is a cross section of a pneumatic tire showing in conjunction therewith a protective armor constructed and arranged in accordance with the present invention, the armor being shown in section, the section being taken as on the line 1—1 in Fig. 2.

Description.

As seen in the drawings, protective armor is disposed in service inside of a flexible shoe 8, and between the same and a pneumatic tube 9. The armor consists of a plurality of articulated thin metal plates 10 and 11.

Figure 2:
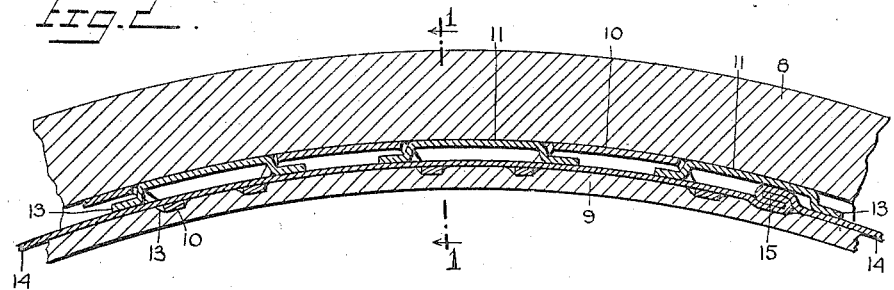
Fig. 2 is a longitudinal section of the exterior wall of the tire, the section being taken as on the line 2—2 in Fig. 1.
Figure 3:
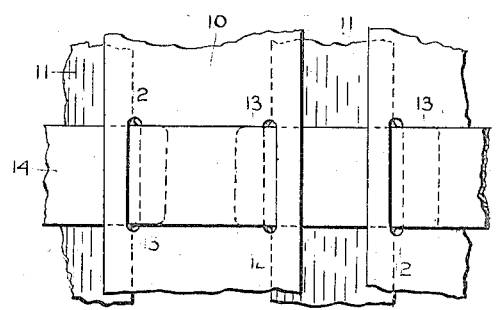
Fig. 3 is a detail view of a fragment of the protective armor.

As seen best in Fig. 3 of the drawings, the plates 10 are centrally provided at opposite edges with slots 12, through which tongues 13 of the adjacent plates 11 extend. The joints thus formed between the plates 10 and 11 are free. The plates 10 and 11 form a continuous chain corresponding in length to the shoe 8 and to the portion thereof adjacent the tread of said shoe. The chain thus formed is held intact by a spring metal band 14, which, as shown in Figs. 2 and 3, passes through all of the slots 12 in all of the plates 10. The ends of the band 14 are united by engaging the interfolding loops 15, seen best in Fig. 2 of the drawings. It will be noted that the joints formed by the tongue 13 and slots 12 are open or normally free. This arrangement permits a certain amount of independent movement of each of the plates and thereby provides in the armor belt the pliability needed to conform with the traffic or operating conditions of the tire.

Claim.

A belt as characterized comprising a plurality of interlocking plates, said plates being disposed in two series, one series having at the opposite edges thereof, slots, the other series having at the opposite edges, tongues corresponding with said slots for extension therethrough; and a fixed metal band adapted to be passed through said slots for maintaining the aggregate circumference of said belt.

JAMES CLYDESDALE.

Witness:
PAUL A. HANSEN.

Copies of this patent may be obtained for five cents each, by addressing the "Commissioner of Patents, Washington, D. C."